United States Patent [19]

Harbeke et al.

[11] Patent Number: 4,511,800
[45] Date of Patent: Apr. 16, 1985

[54] OPTICAL REFLECTANCE METHOD FOR DETERMINING THE SURFACE ROUGHNESS OF MATERIALS IN SEMICONDUCTOR PROCESSING

[75] Inventors: Gunther Harbeke, Affoltern, Switzerland; Michael T. Duffy, Princeton Junction, N.J.

[73] Assignee: RCA Corporation, Princeton, N.J.

[21] Appl. No.: 479,451

[22] Filed: Mar. 28, 1983

[51] Int. Cl.³ ............................................. G01N 21/57
[52] U.S. Cl. ................................. 250/372; 250/358.1; 356/371
[58] Field of Search .......................... 250/372, 358.1; 356/371

[56] References Cited

U.S. PATENT DOCUMENTS 4,290,698  9/1981  Milana ................................ 356/371

Primary Examiner—Alfred E. Smith
Assistant Examiner—Constantine Hannaher
Attorney, Agent, or Firm—Birgit E. Morris; Donald S. Cohen; Joseph D. Lazar

[57] ABSTRACT

This disclosure describes an optical reflectance method for rapid and simultaneous determination of surface roughness and structure of silicon films deposited by chemical vapor deposition. The magnitude of the reflectance of polycrystalline silicon films at a wavelength of about 280 nm can be used directly as a quantitative measure of film surface roughness. The magnitude of the reflectance of as-deposited amorphous or mixed amorphous-polycrystalline silicon films at a wavelength of about 400 nm can be used as a measure of the combined surface roughness and amorphism of the films. Other materials such as metals, alloys and silicides used in semiconductor technology may be evaluated with respect to surface roughness in a similar manner.

5 Claims, 7 Drawing Figures

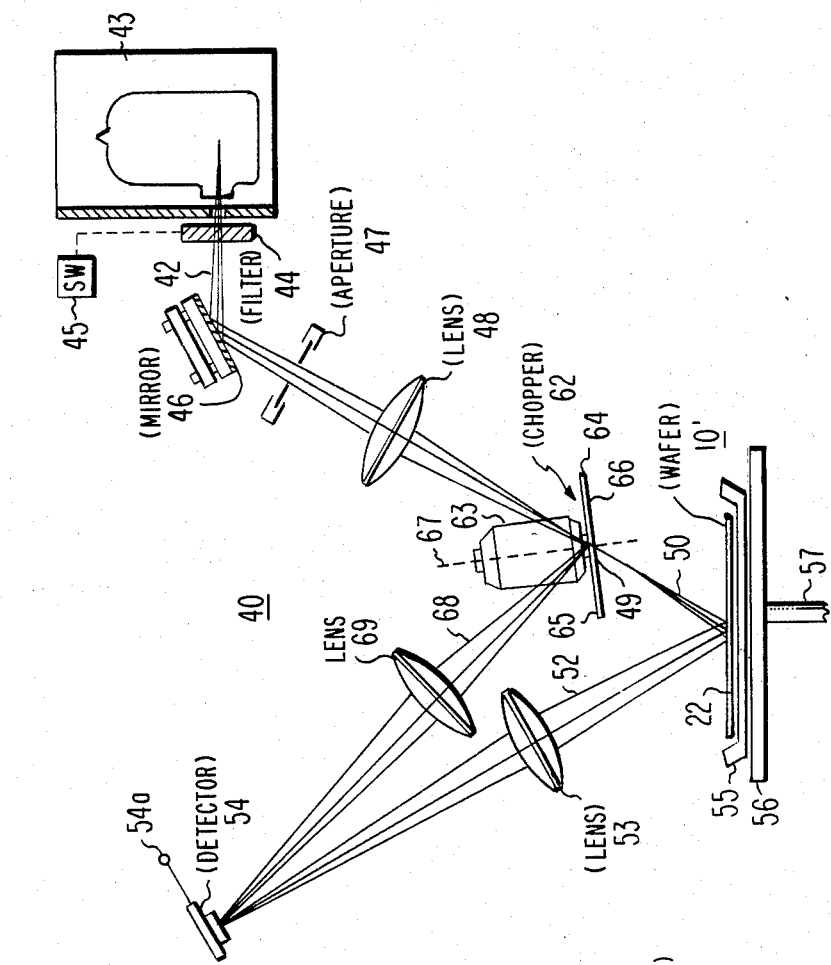
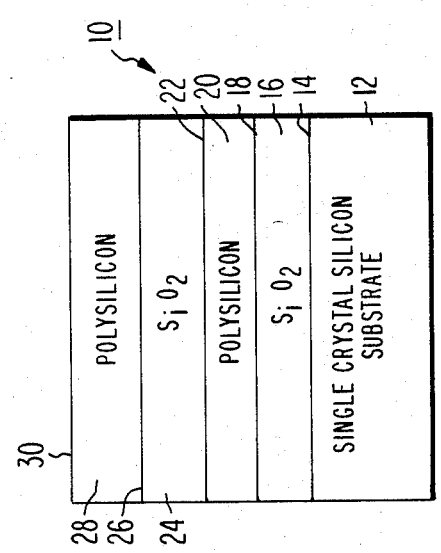
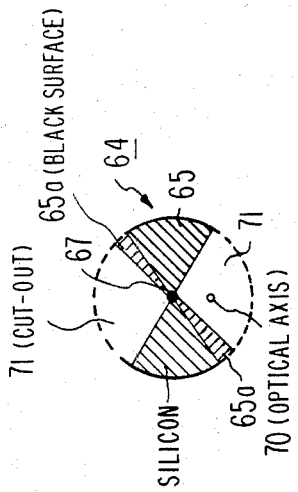
Fig. 1
Fig. 2A
Fig. 2B

OPTICAL REFLECTANCE METHOD FOR DETERMINING THE SURFACE ROUGHNESS OF MATERIALS IN SEMICONDUCTOR PROCESSING

This invention relates to an optical reflectance method for determining the surface roughness of semiconductor and other materials. The invention relates also to the determination, in addition to surface roughness, the degree of amorphism of silicon material.

BACKGROUND OF THE INVENTION

Materials, such as polycrystalline silicon (hereinafter referred to as polysilicon), metal silicides, and metals, such as aluminum, are of growing importance in semiconductor device processing. The surface roughness of such materials is a property of particular importance.

For many applications, interfaces and surfaces formed in the process of device manufacture should be as smooth as possible. For example, the interface between a given polysilicon layer and a silicon dioxide layer grown or deposited on that polysilicon layer should be smooth enough to prevent local electrical field enhancement in the device structures under bias conditions. Local electric field enhancement causes higher current flow through the oxide and low electric breakdown strength. The polysilicon to oxide interface roughness depends upon the roughness of the original surface of the polycrystalline layer on which the oxide is grown or deposited. Photolithographic processing is also more easily performed on smooth surfaces.

In copending U.S. patent application, Ser. No. 441,371, filed Nov. 12, 1982, by A. E. Widmer, et al., there is described a process for the fabrication of polysilicon layers with very low surface roughness in a low pressure chemical vapor deposition (LPCVD) system. The polysilicon layers are deposited with amorphous or mixed amorphous-crystalline structure at a temperature not exceeding 580 Celsius (C) and subsequently crystallized at higher temperatures. The root means square (rms) surface roughness ($\sigma$) of both the as-deposited and annealed polysilicon layers is preferably below 20 angstroms.

U.S. Pat. Nos. 4,352,016 and 4,352,017, issued to M. T. Duffy, et al., relate to techniques for determining the surface crystalline quality of semiconductor material. The technique described in those patents is based on the discovery that the magnitude of the reflectance of heteroepitaxial silicon films at a wavelength of about 280 nanometers (nm) can be used as a quantitative measure of the crystalline quality of heteroepitaxial silicon films, provided the surface physical features, such as surface roughness, do not interfere too strongly with the measurements. In the case of both crystalline and physical imperfections the patents provide for determining the crystalline quality of the surface material by making the reflectance measurements at two different selected wavelengths, viz., 280 and 400 nm, of the incident light. The reflectance at one of the wavelengths (280 nm) is sensitive to both the physical and the crystalline perfection of the surface while the reflectance at the other wavelength (400 nm), called the reference wavelength, is not as sensitive to the crystalline perfection but is nevertheless sensitive to the physical perfection of the surface. Effects of surface physical imperfections are diminished by expressing reflectance values at 280 nm relative to reflectance values at 400 nm. In one mode of operation of the methods described in those patents, a well-polished single crystal silicon wafer serves as a reference reflector.

There is a need in the art for determining in a rapid and nondestructive manner the surface roughness of material such as polysilicon, metal silicides and metals, such as aluminum. Moreover, there is a need for determining rapidly and nondestructively the "degree of amorphism," or, simply, "amorphism" of as-deposited amorphous silicon films prepared by the methods described in the above-identified U.S. patent application, Ser. No. 441,371. Such a determination would aid in the fabrication of complex semiconductor devices.

SUMMARY OF THE INVENTION

According to the present invention, the surface roughness of reflective materials such as semiconductors, silicides or metals, such as aluminum, is rapidly determined by exposing a reference surface of known minimal surface roughness to a first beam of radiation of a first wavelength so that a portion of the beam is reflected from the reference surface. Then exposing the specimen surface to be measured or to be evaluated to a second beam of radiation so that a portion of said beam is reflected from a surface of the specimen, said second beam having a wavelength that is the same as the wavelength of the first beam. The respective intensities of the first and second reflected beams are detected and measured to obtain first and second intensity signals. The first and second intensity signals are compared to provide a difference signal that is used to represent the surface roughness and/or amorphism of the specimen material.

For semiconductor material such as amorphous or polycrystalline silicon, using highly polished single crystal silicon as the reference, and light beams at 280 and 400 nm, respectively, it is possible to obtain a fast assessment of surface roughness and the degree of amorphism of the semiconductor layers.

BRIEF DESCRIPTION OF THE DRAWING

FIG. 1 is an elevation view of a semiconductor wafer in cross-section useful in understanding the present invention;

FIGS. 2A, 2B, and 2C are schematics of apparatus according to the invention for measuring surface roughness and amorphism of the wafer shown in FIG. 1;

DETAILED DESCRIPTION OF THE PREFERRED EMBODIMENTS OF THE INVENTION

Figure 2C:
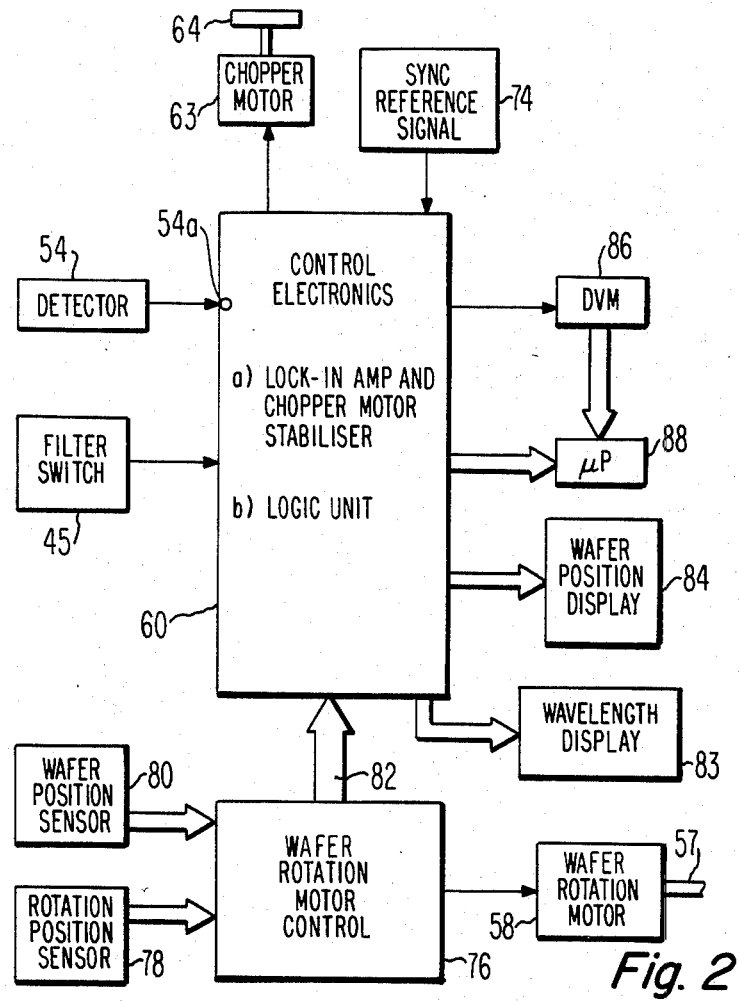

A preferred embodiment of the invention is in the field of semiconductor devices incorporating polysilicon or amorphous silicon. The invention is useful in determining surface roughness of such materials and other materials as will be explained following the present description. Moreover, the invention is useful in determining, in addition to surface roughness, the amorphism of silicon material as will also be described in greater detail hereinafter.

An increasing number of design features in semiconductor processing require vertical structures with a repetition of the sequence of polysilicon films on silicon dioxide films. Disregarding pattern definition etching and other processing steps, the basic vertical structure for two such sequences of films is of the type depicted in FIG. 1 in which a wafer 10 comprises a single crystal silicon substrate 12 upon which a film of silicon dioxide 16 is thermally grown or deposited. The substrate 12 could also be silicon-on-sapphire (SOS). Film 16 is commonly formed by oxidation of silicon from the substrate 12. A film 20 of polysilicon material is deposited on the $SiO_2$ film 16. Similarly, an $SiO_2$ film 24 and polysilicon film 28 are formed.

The respective interfaces 14, 18, 22 and 26 should be smooth enough to prevent local electric field enhancement in the device structure. The smoothness of the interface 22 between the first polysilicon film 20 and the second silicon dioxide film 24, for example, depends on the roughness of the original surface of the polysilicon film 20. The relative roughness of each film affects seriously the film deposited thereon in very thin film technology. Thus, a rough surface can lead to a degradation of the subsequent layer and therefore render the device useless. The above-mentioned copending U.S. patent application of Widmer et al. describes a method of developing polysilicon films from amorphous silicon deposited at temperatures below 580 Celsius (C.). Subsequently, the amorphous material deposited at a temperature below 580 C., preferably in the range of 560 to 580 C., is annealed at temperatures in the order of 950 C. to develop a polycrystalline silicon film that is smooth within the order of 20 angstroms of rms surface roughness.

During the process of fabrication of semiconductor devices using such a technique, it is important to determine from time to time not only the surface roughness of the intermediate films but also to determine the degree of amorphism of the silicon films. The term amorphous material or amorphous semiconductor material, shall mean, in the present description, material that is without crystallinity as detected by x-ray analysis. We say that a silicon film will have polycrystalline character if we can detect crystallites by x-ray analysis with orientations of, for example, (110), (111), and (311). We say that a silicon film has partial amorphous and partial polycrystalline character when both amorphous and polycrystalline material is present in the same film. Polysilicon films deposited by the conventional means of low pressure CVD at, for example, 620 C. or 625 C., may have a preferred orientation of (110) which gives rise to a columnar growth and rough polysilicon surfaces. The films deposited at this temperature of about 620 or 625 C. by low pressure CVD typically have a range of surface roughness characterized by rms values of 30 to 60 angstroms. That means that the actual undulations on the surface manifesting roughness could be several times those rms values.

In the practice of the invention, a monitor or specimen wafer would be included in the CVD reactor in which product wafers are being developed. Since pattern definition etching and other steps are not to be done on this specimen wafer, one can thus obtain a clear assessment of both the roughness and the degree of amorphism of the silicon that is being deposited on the product wafers. It should be thus understood that the specimen 10 illustrated in FIG. 1 is a monitor wafer that is being evaluated or tested according to the invention. Specimen 10 could also be a device wafer in the case of first level silicon films prior to pattern generation.

Reference is now made to FIGS. 2A, 2B and 2C showing apparatus useful for determining the surface roughness and degree of amorphism of semiconductor material during semiconductor device processing.

Apparatus 40 as shown in FIG. 2A comprises a reflectometer that includes a source 43 of light for providing a light beam 42 at a predetermined wavelength determined by a filter 44 which is selected by means of a switch 45 to any desired wavelength. In the present embodiment wavelengths of 280 nm and 400 nm are used. The beam 42 is reflected by a mirror 46 and passed through an aperture 47 for defining and thereby collimating the beam 42. A first lens 48 is used to focus the beam 42 at point 49. The beam 42 then continues as beam 50 to the surface 22 of a wafer 10' which is being evaluated following some step of a device fabrication process. Surface 22 thus could be the surface on the polysilicon film 20 of the wafer 10 shown in FIG. 1. The incident beam 50 is reflected from the surface as reflected beam 52, which, in turn, passes through lens 53, and is focused on the face of a detector 54. Detector 54 converts the reflected beam 52 to an electrical signal which is applied at terminal 54a to control electronics 60 (FIG. 2C) to be described.

The wafer 10' is supported on a sample holder 55 which has a black surface for calibration purposes, as will be explained. The sample holder 55, in turn, is supported on a table 56 in such a manner that it can be moved horizontally and rotated by a shaft 57 from a motor 58 (FIG. 2C). The portion of the refectometer 40 so far described is essentially an embodiment of the apparatus disclosed and described in the above-identified U.S. Pat. No. 4,352,017. The operation of the apparatus as described thus far is similar to that in the aforementioned U.S. patent insofar as the surface of the sample is exposed to a light beam, preferably in the U.V. or near U.V. spectrum, and the intensity of the reflected beam measured by converting it to an electrical signal. According to the method of the patent, the reflected light intensity at one wavelength is compared to the reflected light intensity at a different wavelength to determine the crystalline quality of the surface material of the film. By contrast, the present invention provides the process for determining the surface roughness of a material by two measurements at the same wavelength, one of the measurements involving a reference reflector.

A beam chopper 62 is positioned along the path of beam 42 to periodically interrupt the beam incident on the surface 22 of wafer 10'. The beam chopper 62 comprises a motor 63 operating in the range of 100 to 1000 rpm, and a chopper blade 64 in the form of a butterfly as shown in plan view in FIG. 2B. The upper surface 65, that is, the surface facing the beam 42, is formed of two diametric sectors having highly polished surfaces of single crystal silicon. Between the surface 65 are two cut-out portions 71 to pass light. The bottom surface 66 of the blade 64 is of any material but is preferably black. The chopper axis 67 is positioned slightly offset from the optical axis 70 of the beam 42. Thus, the chopper blade surface 65 periodically interrupts the beam 42. The beam 42 upon striking the silicon surface 65 is reflected along path 68 through a lens 69 to strike the detector 54 at substantially the same detector position as the reflected beam 52. Optionally, a thin sector 65a having a black surface is provided adjacent one edge of each sector of surface 65. These black nonreflecting sectors 65a serve to modulate the light falling on detector 54 which, in turn, provides a detector signal of suitable wave form at terminal 54a.

Reference is now made to FIG. 2C illustrating a suitable system arrangement of the reflectometer 40. The detector 54 is suitably a conventional solid state detector providing a signal at terminal 54a in response sequentially to the reflected light beams 68 and 52. Thus, the signal at 54a to a control electronics 60 represents intermittently a signal from the wafer 10' and from the blade top surface 65.

The control electronics 60 includes a lock-in amplifier and chopper motor stabilizer of known form, and a logic unit for calculating the reflectance signal as will be described. The control electronics 60 is arranged to provide the control voltage for operating the motor 63 which in turn drives the chopper blade 64. A synchronizing reference signal 74 provides the reference signal for the lock-in amplifier. A wafer rotation motor control 76 provides the operating voltage for rotation motor 58 and corresponding data to the control electronics 60 via bus 82. The horizontal and rotational positions of the wafer are sensed by sensors 80 and 78, respectively, which, in turn, have inputs to the wafer rotation control 76. The wavelength of the beam 42, as determined by filter 44, is provided by a display 83 and a display of the wafer position is provided at display 84. The desired output signal of the apparatus 40, determined by the control electronics 60, is displayed at a digital volt meter (dvm) 86. A microprocessor 88 responding to signals from control electronics 60 and the digital volt meter 86 is used, if desired, for computation purposes.

In the practice of the invention the apparatus 40 is calibrated preferably at the beginning of a period of testing wafers. First, the gain of the amplifier of control electronics 60 is set to provide a reading of 1400 units for $\Delta R_{280}$ (as read on the DVM 86) corresponding to the differential reflectance between the chopper blade surface 65 and the black (nonreflecting) surface of the sample holder pan 55. This is achieved by simply operating the reflectometer 40 at 280 nm without any sample on the pan 55 and adjusting the gain to obtain a reading of 1400 units on DVM 86. Next, the reflectometer 40 is balanced at each wavelength by placing a well-polished bulk silicon wafer in the pan 55 and adjusting potentiometers of control electronics 60 to give zero readings on the DVM 86 read-out at each wavelength, namely 280 nm and 400 nm.

With the apparatus 40 calibrated and adjusted as described, the wafer specimen to be evaluated, such as wafer 10', is placed on the sample holder pan 55. The reflectometer 40 is then operated to provide beam 42 at a selected wavelength. According to the invention, one can, after calibration, directly use the magnitude of the reflectance from polycrystalline silicon films to determine the surface roughness. Such a determination is based on the reflectance spectra shown in FIG. 3, particularly the spectrum for polycrystalline silicon 72 which, in this case, corresponds to a film with an rms surface roughness, $\sigma$, of 70–100 angstroms. It can be seen from FIG. 3 that the reflectance of the rough polysilicon film, represented by curve plot 72, is significantly lower than for single crystalline silicon as represented by spectrum 74, and that the magnitude of reflectance (R) is diminished at all wavelengths, but most strongly at the shorter wavelengths below 0.385 µm. Consequently, a differential reflectance measurement between a well-polished single crystal silicon reflector and a polysilicon specimen at the short wavelengths should provide the greatest differential values. This is accomplished by the apparatus just described at a wavelength of 280 nm (i.e. 0.28 µm; see inlet scale 77 in FIG. 3). In practice, this reflectometer provides the reflectance quite rapidly. For example, a reading is provided in about 5–10 seconds. Accordingly, the invention can be used in a product line.

One of the reasons for the divergence of the spectra at the shorter wavelengths is the increased scattering of light by rough surfaces at shorter wavelengths, which in some cases varies with the fourth power of the inverse wavelength. Light scattering results in diminished specular reflection (R) indicative of spectrum 72 in FIG. 3. Another reason for choosing a wavelength of 280 nm for surface roughness determination is that a maximum in the optical absorption coefficient (K) of crystalline silicon occurs at this wavelength and is on the order of $K = 2 \cdot 10^6$ cm$^{-1}$. The penetration depth of light thus has a minimum at $\lambda = 280$ nm of the order of 50 angstroms. The reflectance of light at $\lambda = 280$ nm is therefore most sensitive to a surface layer of thickness comparable with the surface roughness to be determined.

For the two reasons explained above, the wavelength region of about 280 nm is the optimal region for the characterization of the surface roughness of polysilicon although other wavelengths can be used but with less sensitivity.

Figure 4:
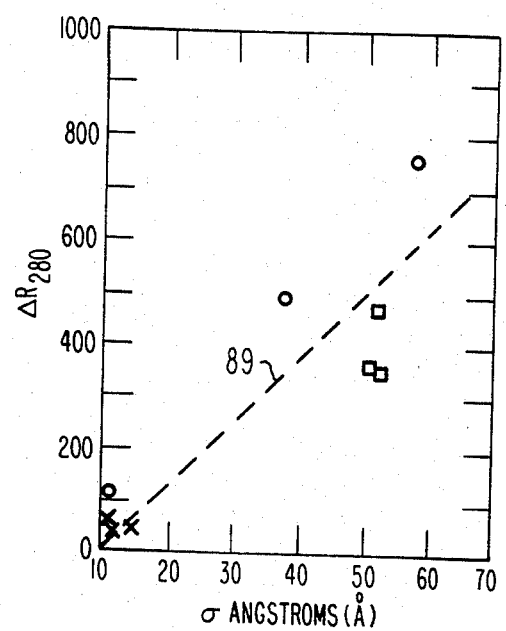
FIG. 4 is a plot of the reflectance intensity signal, representing the difference in reflectance at a wavelength of 280 nm between a single crystal silicon reference reflector and a set of polysilicon samples, versus the corresponding root mean square (rms) surface roughness, $\sigma$, of the silvered surfaces of the same samples.

Reference is now made to FIG. 4 which is a plot of the differential reflectance values, $\Delta R_{280}$, for a set of polysilicon samples plotted against the root mean square (rms) vertical surface roughness, $\sigma$, for the same set of samples. The value of $\Delta R_{280}$ for a given sample represents the difference in reflectance at 280 nm between a single crystal silicon reference reflector and that sample. The value of $\Delta R_{280}$ is expressed in calibrated units, as described above. The value of $\sigma$ was determined from reflectance measurements at 350 nm on the silvered surfaces of the same polysilicon samples for correlation purposes based on a published method. See Cunningham and Bradmeier, Jr. in the Physical Review V14, 479, 1976 for a description of that method. It should be noted that the $\Delta R_{280}$ measurements are made on the original surfaces before silvering. In the practice of the invention, the differential reflectance $\Delta R_{280}$ can be used directly as displayed on the DVM 86 (FIG. 2C). If it is desired to provide the rms roughness, $\sigma$, a microprocessor can be used to calculate the roughness from the reflectance difference ($\Delta R_{280}$). The microprocessor 88 can be used for such purposes. Line 89 in FIG. 4 represents the least squares fit of several experimental samples for which the rms roughness was determined and correlated with the differential reflectance $\Delta R_{280}$, according to the published Cunningham et al. method mentioned above. Line 89 is thus useful in obtaining an estimate of the rms roughness associated with a given value of $\Delta R_{280}$.

In FIG. 4, the x's represent films deposited at 580 C., the circles are for films deposited at 600 C., and the squares for film specimens deposited at 620 C. It can be seen that the reflectance term $\Delta R_{280}$ is a useful parameter for non-destructively determining surface roughness. It should be noted that the method of Cunningham et al. requires coating the surface with a silver layer, whereas the above method is applicable to the as-prepared polysilicon surface. Thus, according to the invention, the measurement of only the reflectance at 280 nm to provide a signal corresponding to the value of $\Delta R_{280}$ constitutes a rapid characterization of the relative roughness of the surface, or, if desired, the rms surface roughness, $\sigma$, of the films. The data representing the rms surface roughness $\sigma$ is easily applied to a computer, such as a microprocessor 88 (FIG. 2C) to provide a value of roughness in response to the signal intensity derived from the reflected beams.

For example, in determining roughness of a specimen surface, the intensity signal differences between the reflections from the specimen 10' and chopper blade 65 at a given wavelength is normalized to provide a normalized reflectance difference signal ($\Delta R_\lambda$). This signal is compared to reference data stored in computer 88 which data represents the surface roughness for corresponding reflectances as shown in FIG. 4. A signal derived from such a comparison represents the surface roughness of a specimen surface.

In many applications in the processing of semiconductor devices, it is desirable to characterize the quality of the films in the as-deposited state before subsequent thermal treatment in which amorphous or mixed-amorphous crystalline films are completely crystallized to polycrystalline films. The embodiment of the invention now to be described provides a means for determining quantitatively, from the magnitude of the reflectance of an as-deposited silicon film at a wavelength of about 400 nm, whether the silicon film is of the desired amorphous or mixed amorphous-crystalline structure.

Figure 3:
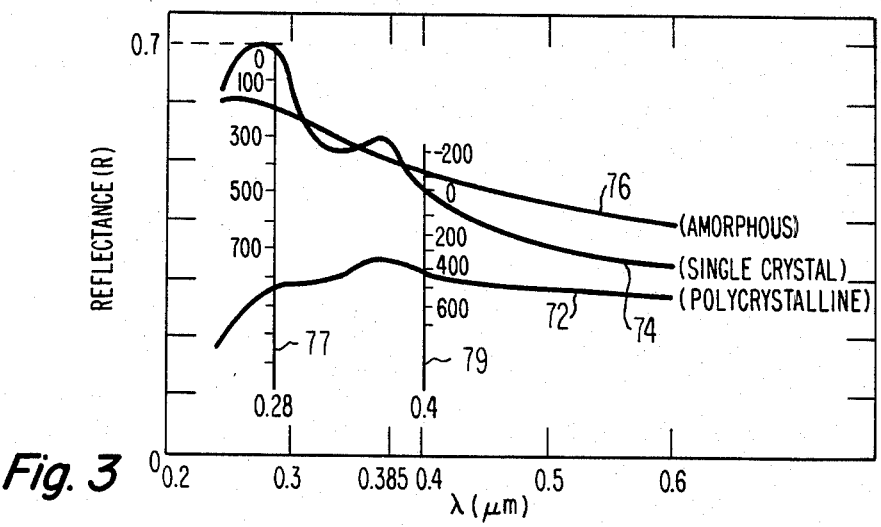
FIG. 3 shows typical reflectance (R) spectra for amorphous silicon, single crystal silicon, and polycrystalline silicon.

This aspect of the invention is based on the curve 76 of FIG. 3 representing, as known in the art, the reflectance spectrum of amorphous silicon. It is seen from curve 76 that the features typical of crystalline silicon do not exist in an amorphous film due to the lack of lattice periodicity. Moreover, the reflectance of amorphous silicon is higher than the reflectance of single crystal silicon, as represented by curve 74, for certain wavelength regions, notably at wavelengths of light greater than 380 nm. Thus, the differential reflectance term, $\Delta R_{400}$, for amorphous silicon, as measured on the apparatus described above, is negative since R (single crystal silicon)—R (amorphous silicon) is a negative quantity at $\lambda = 400$ nm. For convenience, the scales used, by the apparatus described above for the quantities $\Delta R_{280}$ and $\Delta R_{400}$, are appropriately positioned in FIG. 3 at $\lambda = 0.28$ $\mu$m (scale 77) and $\lambda = 0.4$ $\mu$m (scale 79), respectively.

Figure 5:
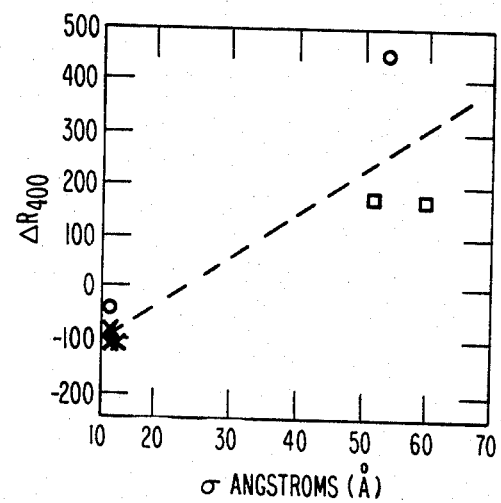
FIG. 5 is a plot similar to FIG. 4 but for reflection of light at 400 nm.

These quantities are utilized for the simultaneous determination of both the surface roughness and structure, that is, the amorphism of the silicon layers in the as-deposited state. The term $\Delta R_{280}$ is preferably used in the surface characterization of polycrystalline silicon films and annealed or crystallized silicon layers which were initially amorphous or partially amorphous. The term $\Delta R_{400}$ is preferably used in the characterization of as-deposited amorphous or partially amorphous silicon films. The $\Delta R_{400}$ term, however, is still meaningful when applied to polycrystalline or crystallized amorphous silicon films, in which case $\Delta R_{400}$ values will be positive since no amorphous component remains in the layers. Only amorphous or mixed amorphous-crystalline films produce negative $\Delta R_{400}$ values. Large negative values can be achieved only if the film is both amorphous and of small surface roughness. This is demonstrated in FIG. 5 wherein the ordinate representing the difference of reflectance $\Delta R_{400}$ for as-grown films of different crystalline structure is plotted against the rms vertical surface roughness $\sigma$. FIG. 6 was made in a manner similar to that as explained for FIG. 4 except that the measurements were at $\lambda = 400$ nm. Large negative values of $\Delta R_{400}$ close to $-100$ are found only for amorphous layers with $\sigma$ values smaller than 15 angstroms. Medium but still negative values of typically $-40$ are found for mixed amorphous-crystalline films with $\sigma$ values smaller than 15 angstroms, whereas mixed amorphous-crystalline or polycrystalline layers with $\sigma$ values greater than 40 angstroms have positive values of $\Delta R_{400}$ of 150 or more.

The measurement of only the reflectance value $\Delta R_{400}$ therefore constitutes, according to the invention, a rapid and simultaneous characterization of both surface roughness (topography) and crystalline structure (morphology) of silicon films. In particular, in the art of chemical vapor deposition (CVD) systems, the invention provides a rapid and quite accurate way of appraising silicon film quality for various applications including multi-layer devices. It will be apparent, in view of the aforementioned studies showing that the surface roughness does not increase upon crystallization of the amorphous films, that the characterization of as-deposited films according to this invention is also useful in predicting film performance in device structures after crystallization.

While the invention has been described for determining surface roughness for semiconductor material such as polycrystalline silicon, the invention can be also practiced in evaluating the surface roughness of the newer materials used in semiconductor processing, such as silicides. In particular, tantalum silicide and titanium silicide may be evaluated. The silicides, incorporated in device structures in patterned thin film form, may serve as conductors for specific functions. The invention may also be used in determining the surface roughness of aluminum or aluminum alloys. Aluminum alloys are used for metallization in semiconductor processing and the roughness of such metallization is of concern in device processing. While the reference surface 65 on the chopper blade 64 (FIG. 2A) and surface 22 of the reference wafer 10 may be formed from any highly polished material, it is preferred to use the same material for the reference surface 65 and surface 22 of the reference wafer 10 as the material that is to be measured. Thus, an aluminum or, preferably, for stability, aluminum alloy surface 65 and surface 22 of the reference wafer 10 can be used for the measurement of the roughness of aluminum and aluminum alloys, while a metal silicide surface 65 and surface 22 of the reference wafer 10 would be used for measuring the roughness of metal silicide.

The wavelength used for surface characterization of metals, metal alloys and silicides could be in the ultraviolet or near-ultraviolet region of the spectrum from about 250 nm to about 400 nm.

What is claimed is:

1. A method of determining the surface roughness of a specimen reflective material comprising:
   (a) exposing a reference surface of a reference reflective material of predetermined reduced surface roughness to a first beam of radiation of a first wavelength from a source of radiation so that a portion of said first beam is reflected from said reference surface;

(b) exposing said specimen reflective surface to a second beam of radiation from said source so that a portion of said second beam is reflected from said surface, said second beam having a wavelength the same as the wavelength of said first radiation beam;

(c) detecting and measuring the intensity of said first and second reflected beams to obtain a first and a second intensity signal; and (d) comparing said first intensity signal with said second intensity signal to determine the difference between the two signals, the magnitude of said difference being a measure of the surface roughness of said specimen reflective material;

(e) wherein said method includes in alternate and rapid sequence reflecting said first beam to said detector and passing said second beam to said specimen surface for reflection to said detector, whereby said detector is alternately in rapid sequence providing substantially continuously said first and second intensity signals for rapid comparison.

2. The method of claim 1 wherein said specimen comprises semiconductor material consisting essentially of polycrystalline silicon and said reference surface is single crystal silicon having a highly polished surface and wherein each of said beams has a wavelength of about 280 nanometers.

3. The method of claim 1 wherein said specimen comprises aluminum or metal silicide, and wherein said reference surface comprises single crystal silicon, aluminum, or metal silicide, having a smooth surface and wherein each of said beams has a wavelength of between 250 nm and 400 nm.

4. The method of claim 1 wherein said comparison step comprises:

normalizing the difference between said intensity signals with respect to said reference signal to provide a normalized reflectance difference signal;

comparing said normalized difference signal to reference data stored in a computer memory representing surface roughness for corresponding reflectances; and providing an output signal indicative of the surface roughness of said specimen surface.

5. A method of determining both the surface roughness and degree of amorphism of an amorphous or mixed amorphous-polycrystalline silicon specimen comprising:

(a) exposing a reference surface of highly polished single crystal silicon to a first beam of radiation of wavelength at about 400 nanometers (nm) from a source of radiation so that a portion of said first beam is reflected from said surface;

(b) exposing said amorphous or mixed amorphous-polycrystalline silicon specimen to a second beam of radiation from said source so that a portion of said second beam is reflected from said specimen surface, said second beam having a wavelength the same as the wavelength of said first radiation beam;

(c) detecting and measuring the intensity of said first and second reflected beams to obtain a first and second intensity signal;

(d) comparing said first intensity signal with said second intensity signal to determing the difference between the two signals, the magnitude of said difference being a measure of the degree of amorphism and surface roughness of said silicon specimen.

* * * * *